Patented Dec. 29, 1953

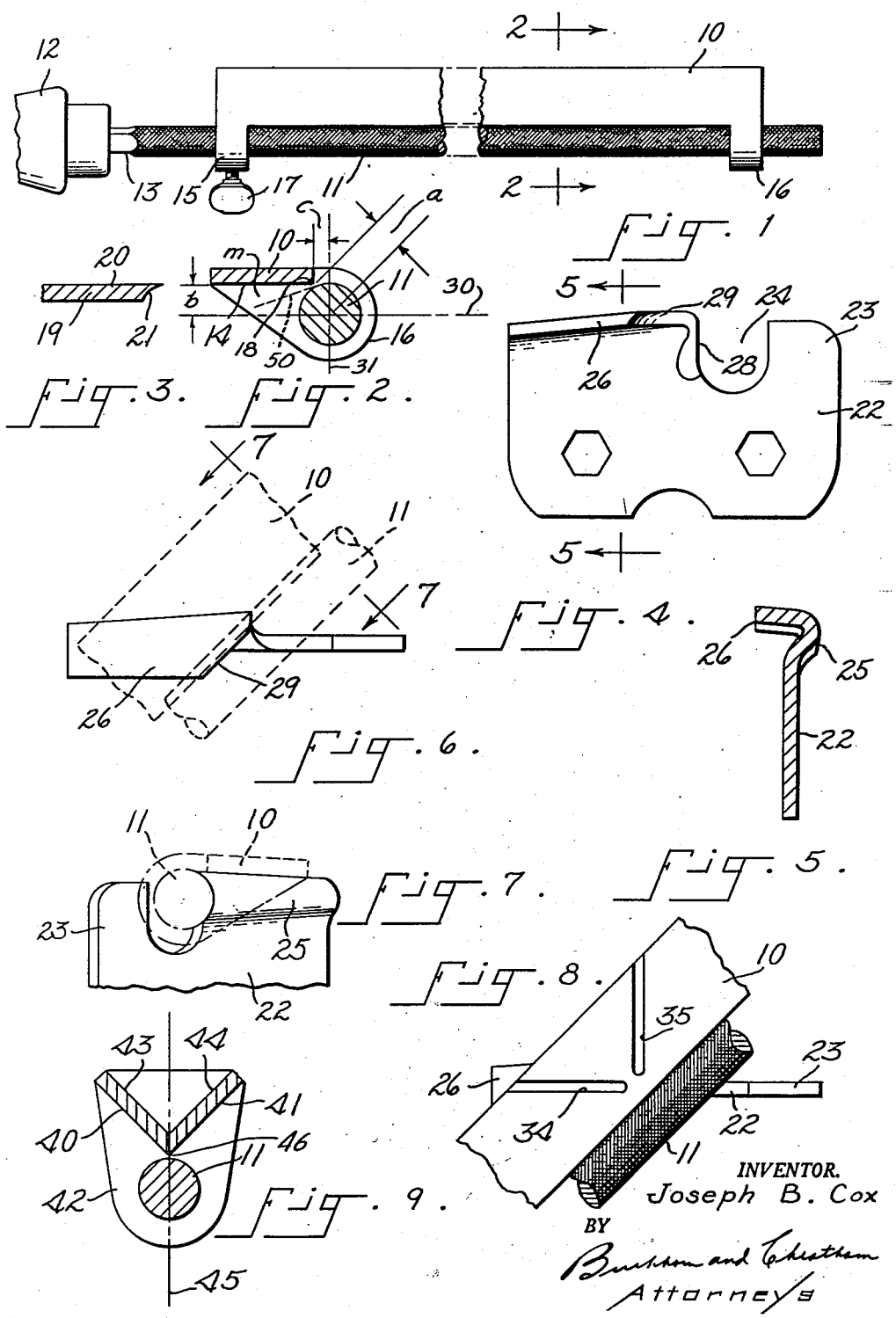

2,664,017

UNITED STATES PATENT OFFICE 2,664,017

FILE HOLDER

Joseph B. Cox, Portland, Oreg., assignor, by mesne assignments, to Oregon Saw Chain Corporation, Portland, Oreg., a corporation of Oregon Application March 13, 1950, Serial No. 149,429

8 Claims. (Cl. 76—36)

The present invention relates to round file holders particularly suitable for use in filing of saw chains.

One form of power saw chain is provided with hook-shaped cutting teeth and which may be sharpened by means of a round file. While such teeth may be filed free hand by one possessed with reasonable skill, the file holder of the present invention makes it possible for an unskilled filer to sharpen such saw chain teeth quickly and with a high degree of accuracy.

It is a general object, therefore, of the present invention to provide a new and improved file holder for use in sharpening hook-shaped saw chain teeth.

A second general object of the present invention is to provide a new and improved holder for cylindrically round files for facilitating the filing of concavely beveled cutting edges on wood cutting tools.

More specifically, it is an object of the present invention to provide a holder for cylindrically round files whereby concavely beveled cutting edges may be formed on wood cutting tools efficiently, accurately and with a minimum of effort and skill required.

A still further object of the invention is to provide a file holder for use with cylindrically round files adapted for sharpening hook-shaped saw chain teeth, the holder defining pairs of angularly disposed plane surfaces for gauging the position of the file with respect to the cutting edge to be filed, and being suitable for use in filing both right and left saw chain teeth.

A still further object of the present invention is to provide a file holder of the type described with markings upon an upper surface thereof for facilitating the accurate alignment of the file with the direction of the cutting edge of the teeth.

In accordance with the present invention, I provide a file holder consisting of an elongate metal bar defining one or more longitudinal plane surfaces with means for attaching the bar relatively onto a cylindrically round file in such a manner that the plane bar surface extends closely adjacent and parallel with the file, the plane of the surface intersecting by a small amount the cylindrical surface of the file whereby a relatively small acute angle is formed between the plane surface and the cylindrical surface of the file. In use, the flat plane surface of the holder is rested upon a correspondingly flat surface of the cutting tool and with the axis of the file extending parallel with the direction of the cutting edge. Upon longitudinal movement of the file in engagement with the cutting edge, a sharp concavely beveled edge may be formed upon the cutting tool accurately and with a minimum of effort.

For a consideration of what is believed novel and inventive, attention is directed to the following description taken in connection with the accompanying drawings while the features of novelty will be pointed out with greater particularity in the appended claims.

In the drawings, Fig. 1 is a side elevation illustrating a file holder of the present invention according to one modification thereof; Fig. 2 is a cross-sectional view taken along line 2—2 of Fig. 1; Fig. 3 is a sectional view of a portion of a chisel blade shown for purposes of illustration of certain features of the invention; Fig. 4 is a side elevation of a saw chain tooth which may be readily sharpened thru usage of the holder of the present invention; Fig. 5 is a sectional view taken along line 5—5 of Fig. 4; Fig. 6 is a top view of the tooth shown in Fig. 4; Fig. 7 is a view taken along line 7—7 of Fig. 6; Fig. 8 is a top view of a portion of the file holder shown in Fig. 1; and Fig. 9 is a cross-sectional view illustrating a file holder according to the preferred modification of the invention.

In the drawings, the file holder of the present invention is shown in its simplest form in Fig. 1 at 10 having a cylindrically round file 11 mounted therein. The round file 11 is also provided with a suitable handle 12, which may be of wood, driven upon the tang 13 thereof. As illustrated more clearly in the sectional view of Fig. 2, the file holder 10 consists of an elongate metal bar defining a longitudinal plane reference surface 14 extending parallel with the axis of the file 11, the bar being provided with bracket lug portions 15 and 16 at the opposite ends thereof extending outwardly at right angles with respect thereto, the lug portions being provided with round openings for cooperatively and snugly receiving the file 11 therethrough. The openings are only slightly larger than the diameter of the file 11 and means such as a thumb screw 17 is provided in one of the lug portions for tightening against the shank of the file and for relatively securing the holder 10 with respect to the file. The edge 18 of the bar adjacent the file 11 is straight and parallel to the axis of the file 11.

It will be observed with reference to Fig. 2 that the plane of the surface 14 of the file holder is spaced very slightly closer to the axis of the openings in the bracket lugs 15 and 16 than one half the diameter of such openings so that the extended plane of the surface 14 intersects by a slight amount the cylindrical surface of the round file 11 whereby said plane of the reference surface and a plane 50 tangential to the file at the point of intersection of the reference surface plane therewith define a relatively small acute angle m.

Defining the relationship of the file 11 and holder 10 in another way, it will be seen from Fig. 2 that the axis of the file 11 is positioned from the edge 18 of the holder bar member by a distance a slightly greater than the radius of the file. Also, the file is positioned with its axis lying in a first plane 30 parallel to the reference surface 14 and spaced therefrom by a distance b slightly less than the radius of the file 11. The axis of the file also lies in a second plane 31 normal to the reference surface 14 and parallel with the edge 18 and spaced therefrom by a distance c, slightly less than the radius of the file.

In Fig. 3 is shown at 19 a wood cutting tool such as a chisel blade having a flat, lower surface 20, the blade 19 being shown inverted in Fig. 3 for more clearly illustrating the manner of usage of the file holder of the present invention. The chisel blade 19 may be suitably held such as within a vise (not shown), and the file holder is then placed upon the blade 19 with the surface 14 resting flatwise upon the surface 20 of the blade 19. The axis of the file 11 will therefore extend parallel with the cutting edge on the end of the blade 19 and when reciprocated in the longitudinal direction, a concavely beveled edge may be filed on the end of the blade 19 as indicated at 21, the radius of curvature of the beveled cutting edge 21 corresponding with the radius of curvature of the file 11. Because of the fact that the plane of the surface 14 intersects by a slight amount the cylindrical surface of the file 11, the file will form a sharp edge upon the blade 20, the thinness of which will be determined by the acuteness of the angle m at the point of intersection between the plane of surface 14 and the cylindrical file surface.

It will be obvious to those skilled in the art that it would be difficult to file accurately a concavely beveled edge upon a cutting tool such as 19 free hand and, while it has been common to hollow grind edges on cutting tools by machines, the present holder enables comparable results to be obtained manually. The holder is extremely simple in design, inexpensive and easy to use.

The file holder of the present invention finds its greatest utility in the sharpening of hook shaped chain saw teeth of the type shown, for example, in Figs. 4, 5, 6 and 7. The chain saw tooth illustrated is formed upon the upper end of a chain link plate 22 having a depth gauge 23 formed on the forward end thereof and separated from the tooth by a recess 24. As illustrated more clearly in the sectional view of Fig. 5, the shank portion 25 is first bent laterally outwardly while the toe portion 26 extends back over the top of the plate 22 in a direction substantially at right angles with respect to the plane of the plate 22. The forward edge of the shank and toe portions is provided with a chisel edge. The chisel edge of the shank portion 25, shown at 28 in Fig. 4, is substantially at vertical right angles with respect to the longitudinal direction of the plate 22 while the edge 29 of the toe portion 26 extends at a horizontal angle of substantially 45° with respect to the longitudinal direction of the plate 22, as shown more clearly in Fig. 6.

With reference to the view of Fig. 7, it will be observed that the chisel edge when viewed at a 45° angle with respect to the plane of the plate 22 conforms to a cylindrical surface. A round file is shown in contacting or cutting engagement with the chisel edge 28—29 of the shank and toe portions of the tooth by dotted lines 11 in Figs. 6 and 7, while the holder bar is indicated at 10.

In Fig. 8 is shown the file 11 mounted within the holder 10 and with the holder 10 extending in flatwise engagement with the plane upper surface of the toe portion 26 of the saw tooth. It will, of course, be obvious that, during the usage of the file holder in sharpening chain saw teeth of the type described, the angular chisel edge of the toe portion 29 will be concealed from view by the operator looking down from above. In order to facilitate alignment of the file with the cutting edge, a suitable marking or score 34 may be provided upon the upper surface of the holder bar. Since the rake of the edge 29 is assumed to be 45°, the marking 34 also extends at a 45° angle with respect to the axis of the file mounted within the holder and which marking may readily be aligned in parallel relation with respect to the vertical plane of the tooth plate 22. Because of the fact that chain saw teeth face alternately right and left, it is desirable that a second guide marking 35 be also provided upon the upper surface of the bar 10 extending at an angle of 90° with respect to the marking 34 for facilitating the alignment of the file with respect to an oppositely facing tooth.

For greater convenience in the filing of chain saws and particularly to enable the filing of both right and left saw teeth with the operator standing at the same side of the saw and without requiring an end to end reversal of the file and holder, it is preferred to provide a file holder of the form illustrated in the cross-sectional view of Fig. 9. In this preferred modification, the file holder consists of an elongate bar defining a pair of longitudinal plane surfaces 40 and 41 extending substantially at right angles with respect to each other and intersecting along a line or common straight edge 46 substantially parallel with the axis of the file 11 supported in openings provided in lug portions 42 substantially similar to the lug portions 15 and 16 as previously described. Substantially the same relationship exists between the axial alignment of the file 11 in this instance and each of the plane surfaces 40 and 41 and their common straight edge 46 as was described with reference to the axis of the file 11 and the holder surface 14 in Fig. 2. The file 11 is symmetrically supported by the bracket lugs 42 whereby a plane, indicated by dotted line 45, extending parallel with and through the axis of the file 11 and the line of intersection of the surfaces 40 and 41 divides equally the angle between such surfaces.

The manner in which the holder of this modification is used is substantially the same as that previously described, the difference being that, since two plane surfaces are provided in this instance, the tool may be held by the handle 12 in the same hand and, simply by shifting from one face of the holder to the other, both right and left chain saw teeth may be sharpened.

The bar is recessed on the side thereof opposite the surfaces 40 and 41 to provide two surfaces 43 and 44 substantially parallel with the opposite corresponding surfaces 40 and 41 extending longitudinally of the holder. Markings may be provided upon both of these surfaces 43 and 44 as described in connection with Fig. 8 for gauging the alignment of the file with the angular chisel edge of the saw teeth.

The file holders are preferably made of a hard metal such as beryllium copper which is rust proof and work hardening and not subject to wear or abrasion. By loosening the thumb screw and rotating the file, it can be indexed to new wear positions.

For the sake of convenience and brevity, in the claims the reference surface 14 of the holder and the periphery of the file 11 are sometimes stated to define "a relatively small acute angle." It is to be understood that what is meant by this is that the surface 14 and the plane 50 define such an angle.

Having described the invention in what is considered to be preferred embodiments thereof, it is desired that it be understood that it is intended by the following claims to cover all such variations as fall within the true spirit and scope of the invention.

I claim:

1. A file holder comprising an elongate metal bar, said bar defining a pair of intersecting outer plane surfaces extending longitudinally thereof, a lug portion extending outwardly from each of the opposite ends of said bar substantially at right angles with respect to the line of intersection of said surfaces, aligned round openings in each of said lug portions for cooperatively receiving a cylindrical round file therethrough, means for relatively securing said file to said holder, the axis of said openings extending parallel with said line of intersection and spaced therefrom a distance corresponding substantially to one-half the diameter of said openings, the plane aligned with and extending through said axis and said line of intersection equally dividing the angle between said plane surfaces, the said bar being longitudinally recessed on the side thereof opposite said plane surfaces so as to define a pair of inner elongate surfaces parallel with corresponding ones of said outer plane surfaces, a pair of straight line guide markings on each of said inner surfaces, said markings each extending substantially at a 45° angle with respect to the longitudinal direction of said bar, the angle between the markings of each of said pairs being substantially equal to 90°.

2. A file holder comprising an elongate metal bar, said bar defining a pair of intersecting outer plane surfaces extending longitudinally thereof, said surfaces extending substantially at right angles with respect to each other, a lug extending at right angles from each of the opposite ends of said bar in the direction at right angles with respect to said line of intersection, aligned, round openings in each of said lug portions for cooperatively receiving a round file therethrough of substantially the same diameter, means for relatively securing said holder to said file, the axis of said openings being parallel with said line of intersection and the plane aligned with and extending through said axis and line of intersection dividing equally the angle between said plane surfaces, said line of intersection being substantially aligned with the adjacent peripheries of said openings.

3. A file holder comprising an elongate metal bar, said bar defining a pair of intersecting outer plane surfaces extending longitudinally thereof, a lug portion extending outwardly from each of the opposite ends of said bar substantially at right angles with respect to the line of intersection of said surfaces, aligned round openings in each of said lug portions for cooperatively receiving a round file therethrough, means for relatively securing said file to said holder, the axis of said openings extending parallel with said line of intersection and spaced therefrom a distance corresponding substantially to one-half the diameter of said openings, the plane aligned with and extending through said axis and said line of intersection equally dividing the angle between said plane surfaces.

4. A file holder comprising an elongate metal bar, said bar defining a first plane surface extending longitudinally thereof, said bar including a lug portion extending outwardly from each of the opposite ends of said bar substantially at right angles with respect to said surface, aligned round openings in each of said lug portions for cooperatively and snugly receiving a cylindrical round file therethrough, means for relatively securing said file to said holder, the axis of said openings extending parallel with said surface, a longitudinal straight edge of said plane surface extending closely adjacent the periphery of said openings, the plane of said surface intersecting the circle of said openings whereby a relatively small acute angle is formed between the plane of said surface and the adjacent portion of the cylindrical surface of a round file mounted in said openings, said bar defining a second longitudinal plane surface parallel with said first plane surface, a pair of straight line guide markings on said second plane surface, said markings each extending substantially at a 45° angle with respect to the longitudinal direction of said bar, the angle between said markings being substantially equal to 90°.

5. A file holder comprising an elongate metal bar, said bar defining a plane surface extending longitudinally thereof, said bar including a lug portion extending outwardly from each of the outer ends of said bar substantially at right angles with respect to said surface, aligned round openings in each of said lug portions for cooperatively receiving a round file therethrough, means for relatively securing said file to said holder, the axis of said openings extending parallel with said surface, a longitudinal straight edge of said plane surface extending closely adjacent the periphery of said openings and parallel with said axis, the plane of said surface intersecting the circle of said openings whereby a relatively small acute angle is formed between the plane of said surface and the adjacent portion of the cylindrical surface of a round file mounted in said openings.

6. A file holder for use in filing a concavely beveled cutting edge on a cutting tool comprising an elongate metal bar, said bar defining a plane surface extending longitudinally thereof, said bar including a portion extending outwardly from each of the opposite ends thereof, aligned openings in each of said portions for cooperatively receiving a round file therethrough, means for relatively securing said file to said holder, the axis of said openings extending parallel with said surface, a longitudinal straight edge of said plane surface extending closely adjacent said openings and parallel with said axis, the plane of said surface intersecting said openings whereby a relatively small, acute angle is formed between the plane of said surface and the adjacent portion of the cylindrical surface of a round file mounted in said openings.

7. A file holder for use in forming a concavely beveled cutting edge on a cutting tool, said holder comprising a member defining a flat, planar reference surface having one straight edge, and means on said member for securing thereto in laterally offset relation a cylindrical file of predetermined diameter with the axis of said file parallel with said edge and spaced therefrom by a distance slightly greater than the radius of said file, and with the axis of said file lying in a plane parallel to said surface and spaced therefrom by a distance slightly less than the radius of said file, whereby the plane of said reference surface and the periphery of said file define a relatively small acute angle therebetween.

8. A device for use in forming a concavely beveled cutting edge on a cutting tool comprising in combination an elongate round file and a holder therefor, said holder comprising an elongate, rigid member formed with a flat, planar reference surface having a longitudinally extending straight edge, and file holding means on each of the opposite ends of said member for securing said file thereto with the axis of said file extending substantially parallel with said edge and positioned from said edge by a distance slightly greater than the radius of the file, and with the axis of said file lying in a first plane parallel to said reference surface and spaced from the plane of the reference surface by a distance just slightly less than the radius of said file, and with the axis of said file lying in a second plane normal to said reference surface and parallel with said edge and spaced from said edge by a distance slightly less than the radius of said file.

JOSEPH B. COX.

References Cited in the file of this patent

UNITED STATES PATENTS

| Number | Name | Date |
|---|---|---|
| 193,209 | Atkins | July 17, 1877 |
| 210,076 | Atkins | Nov. 19, 1878 |
| 310,735 | Sherman | Jan. 13, 1885 |
| 494,498 | Taylor | Mar. 28, 1893 |
| 702,150 | Peiseler | June 10, 1902 |
| 740,736 | Blocher | Oct. 6, 1903 |
| 794,855 | Ennis | July 18, 1905 |
| 1,529,472 | Falos | Mar. 10, 1925 |
| 1,708,388 | House | Apr. 9, 1929 |

FOREIGN PATENTS

| Number | Country | Date |
|---|---|---|
| 24,181 | Sweden | Feb. 15, 1908 |